No. 868,358. PATENTED OCT. 15, 1907.
E. P. NOYES.
CONTROLLING APPARATUS FOR HEAT ENGINES.
APPLICATION FILED NOV. 11, 1899.
5 SHEETS—SHEET 1.
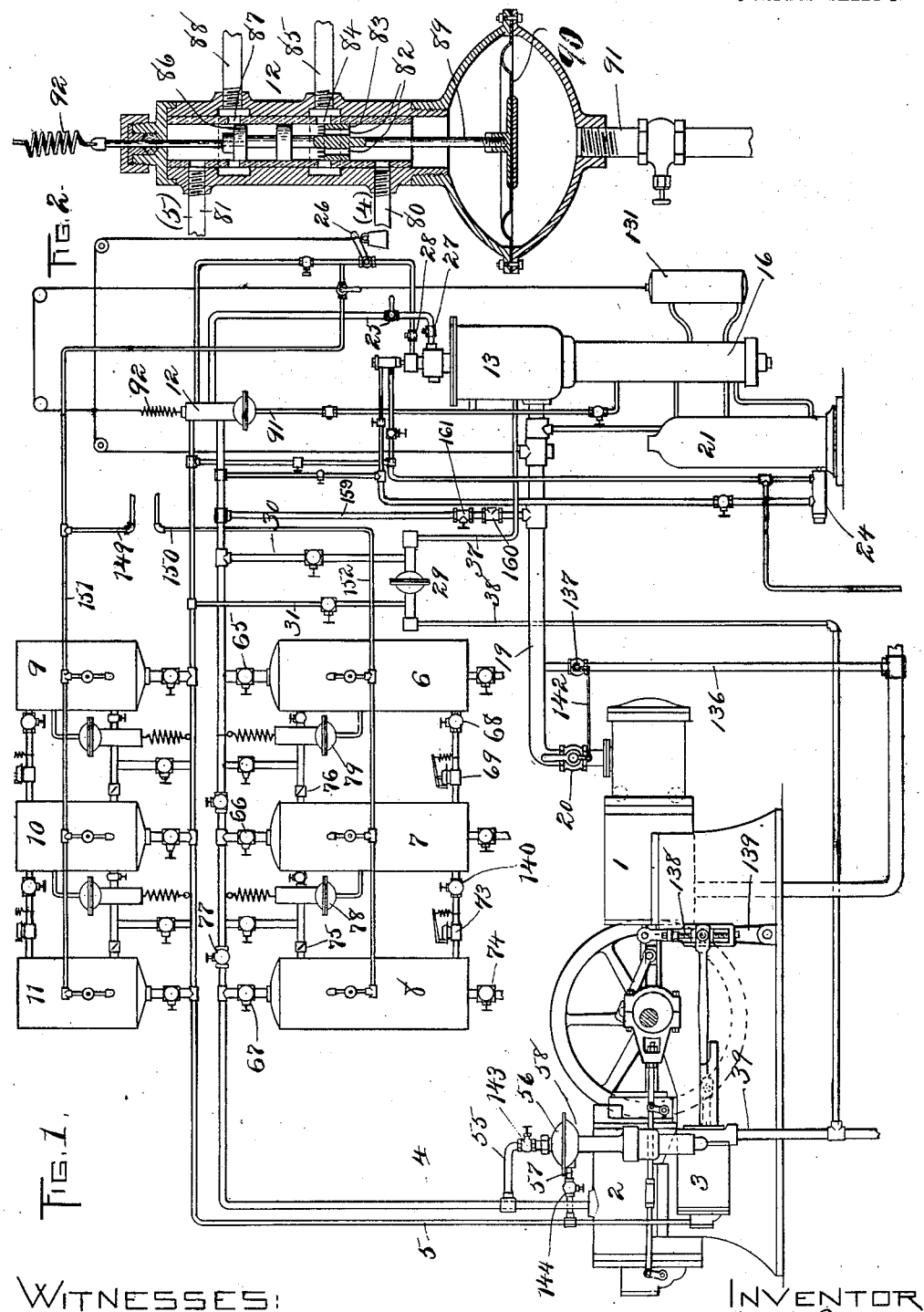
WITNESSES:
INVENTOR:

No. 868,358.  
PATENTED OCT. 15, 1907.  
E. P. NOYES.  
CONTROLLING APPARATUS FOR HEAT ENGINES.  
APPLICATION FILED NOV. 11, 1899.  
5 SHEETS—SHEET 2.
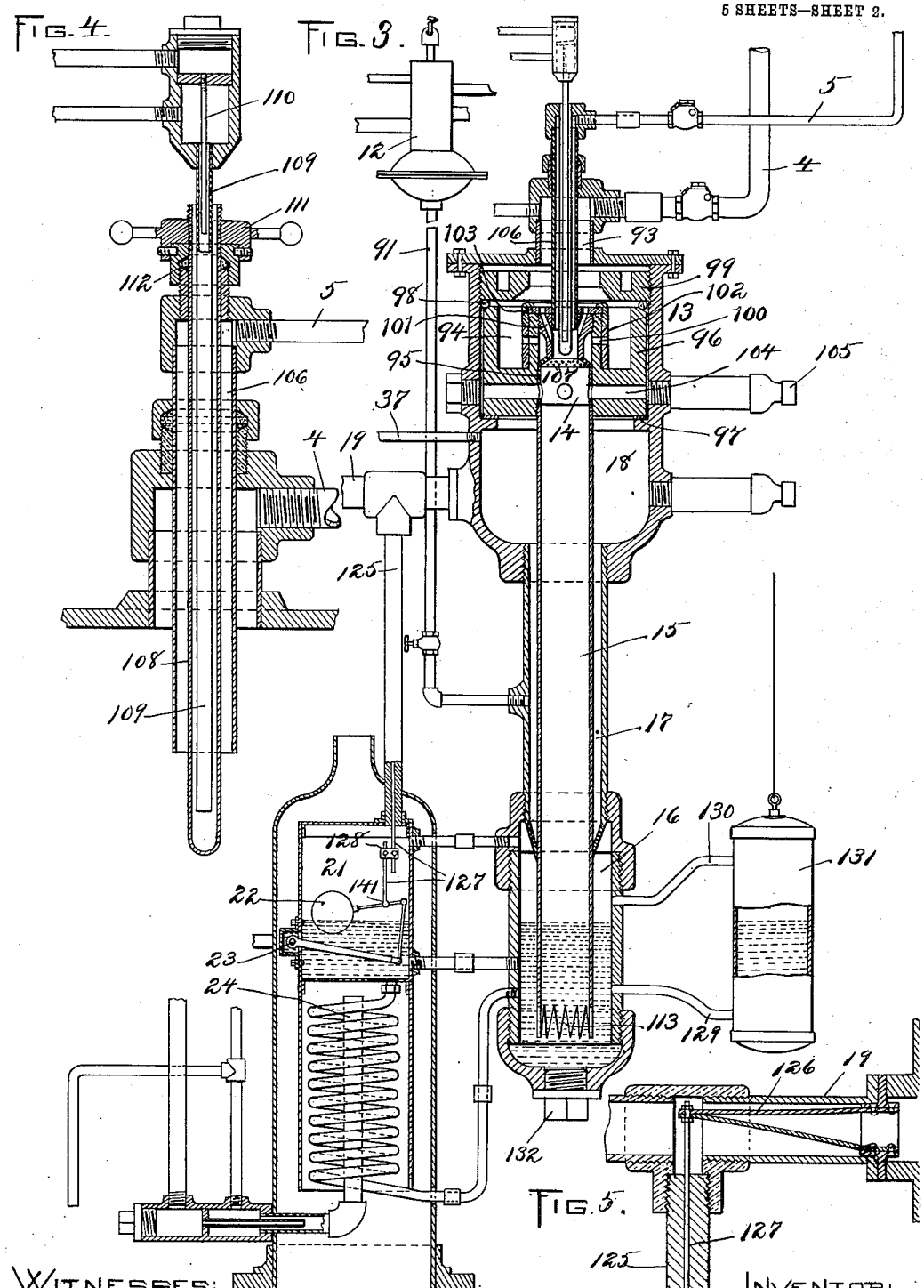
WITNESSES:  
INVENTOR:

No. 868,358.
PATENTED OCT. 15, 1907.
E. P. NOYES.
CONTROLLING APPARATUS FOR HEAT ENGINES.
APPLICATION FILED NOV. 11, 1899.
5 SHEETS—SHEET 3.
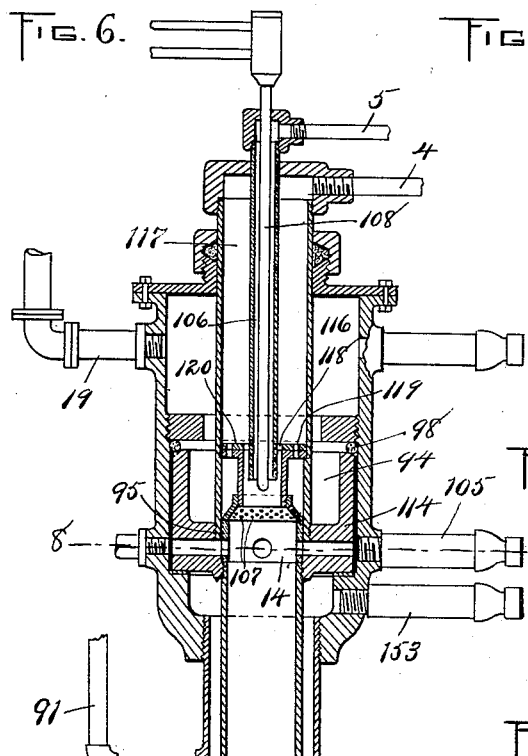
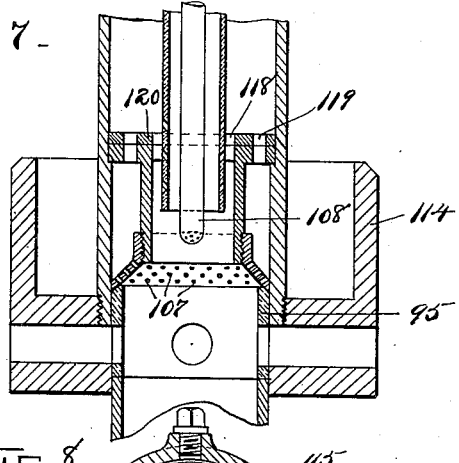
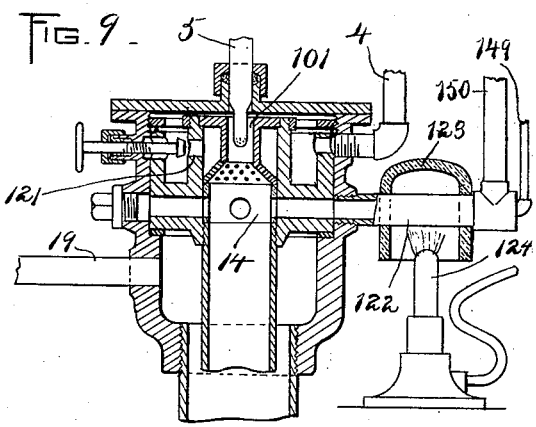
WITNESSES:
A. D. Harrison.
Peter W. Pezzetti.
INVENTOR:
Edward P. Noyes
by Wright, Brown & Quimby
Attys.

No. 868,358. PATENTED OCT. 15, 1907.
E. P. NOYES.
CONTROLLING APPARATUS FOR HEAT ENGINES.
APPLICATION FILED NOV. 11, 1899.
5 SHEETS—SHEET 4.
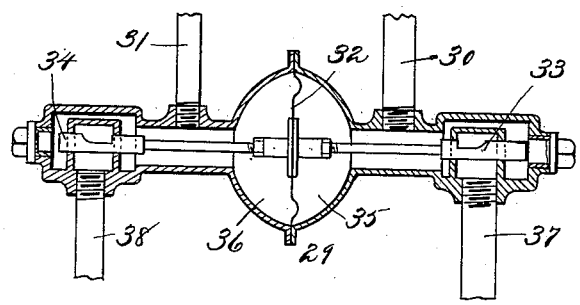
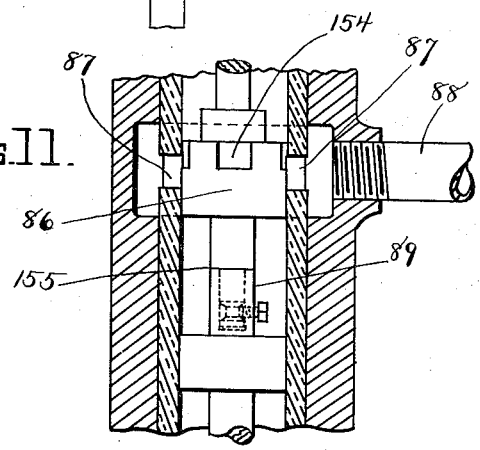
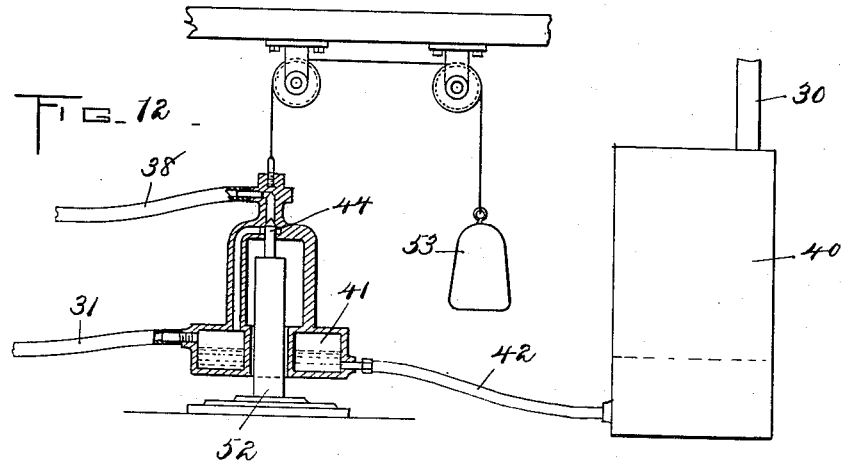
WITNESSES:
A. D. Harrison
Peter W. Pizzetti
INVENTOR:
Edward P. Noyes
by Wright, Brown & Quimby
Attys.

No. 868,358. PATENTED OCT. 15, 1907.
E. P. NOYES.
CONTROLLING APPARATUS FOR HEAT ENGINES.
APPLICATION FILED NOV. 11, 1899.
5 SHEETS—SHEET 5.
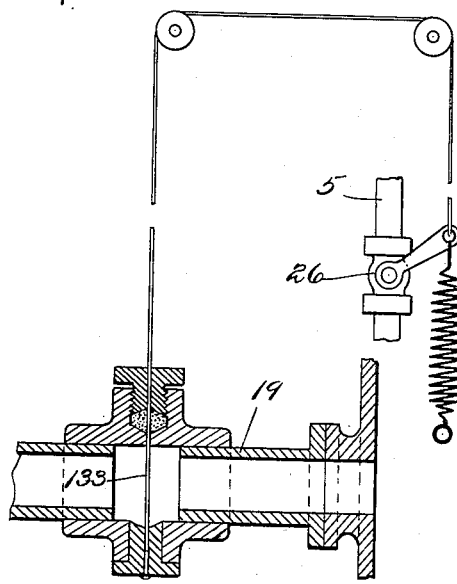
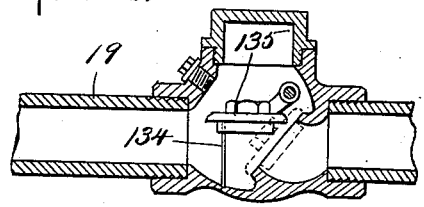
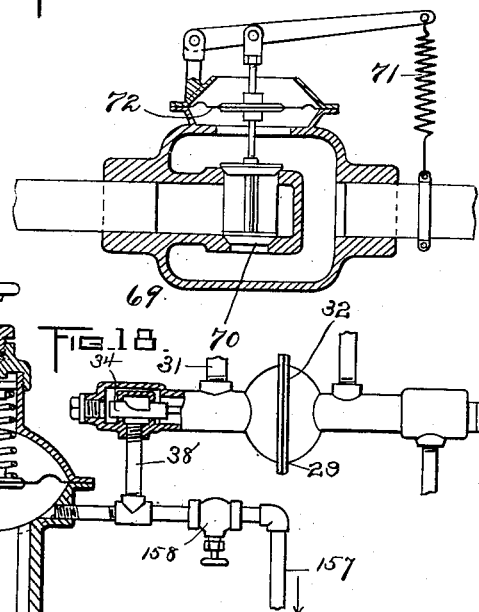
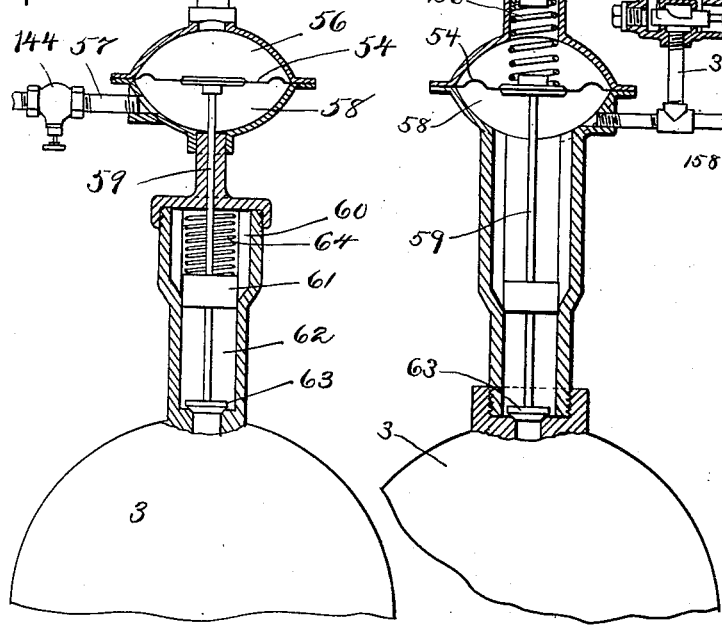
WITNESSES:
A. D. Harrison
Peter W. Pezzetti
INVENTOR:
Edward P. Noyes
by Wright, Brown & Quinby
Attys

UNITED STATES PATENT OFFICE.

EDWARD P. NOYES, OF WINCHESTER, MASSACHUSETTS.

CONTROLLING APPARATUS FOR HEAT-ENGINES.

No. 868,358.   Specification of Letters Patent.   Patented Oct. 15, 1907.

Application filed November 11, 1899. Serial No. 736,588.

*To all whom it may concern:*

Be it known that I, EDWARD P. NOYES, of Winchester, in the county of Middlesex and State of Massachusetts, have invented certain new and useful Improvements in Controlling Apparatus for Heat-Engines, of which the following is a specification.

This invention relates to internal-combustion power systems and as a preferred embodiment thereof I have shown the combustion carried on by the constant-flame method as described in Reeve patents Nos. 588,178 and 588,293, but the invention will be understood as not being wholly confined to this manner of burning the fuel. Said patents set forth a power system or apparatus including an engine, a fuel-compressor and an air-compressor, a burner for uniting the two fluids in combustion, means for proportioning their flow before reaching the burner, and a cooling-chamber in which the products of combustion are passed through or over a body of water in order to reduce their temperature to a stable working point before they reach the working cylinder of the engine, and means for controlling the water-supply to said cooling-chamber.

The object of the present invention is to provide increased and improved control over the temperatures, pressures, and volumes in a system of the kind specified or in other systems to which the improvements may be found to apply, for pre-heating of the apparatus and its contents, and for effecting a start.

To these ends, the invention consists in certain novel features of construction and arrangement hereinafter claimed, and described as to their practical embodiment in the specification.

Reference is to be had to the accompanying drawings, in which—

Figure 1 represents a diagrammatic view of a power system embodying my invention. Fig. 2 represents a longitudinal sectional view of the fluid-controlling and pressure-reducing valve. Fig. 3 represents a vertical sectional view of the burner, cooling-chamber, and adjacent parts. Fig. 4 represents a vertical sectional view of a form of igniter. Fig. 5 represents a sectional view of the thermostat in the engine-pipe. Fig. 6 represents a vertical sectional view of a burner and cooling-chamber, with provisions for increased jacketing of combustion-chamber and fluid-spaces. Fig. 7 represents an enlarged vertical sectional view of parts shown in the latter figure. Fig. 8 represents a horizontal section on the line 8—8 of Fig. 6. Fig. 9 represents a vertical sectional view, showing an alternate form of igniter. Fig. 10 represents a sectional view, showing a differential device controlling the air and gas pressures. Fig. 11 represents an enlarged detail sectional view, showing a modification of the valve illustrated in Fig. 2. Fig. 12 represents a sectional view, showing an alternate device for controlling air and gas pressures. Figs. 13 and 14 represent sectional views of alternate forms of safety devices in the engine-pipe. Fig. 15 represents a sectional view of a device for controlling the compressor-output. Fig. 16 represents a sectional view of a reservoir-valve hereinafter referred to. Fig. 17 represents a longitudinal section of one of the peep-hole tubes. Fig. 18 represents a sectional view, showing means for utilizing excess fluid-pressures to perform useful work.

The same reference characters indicate the same parts in the various figures.

Referring to the drawings,—1 is an engine, mechanically connected in any suitable manner with a compressor 2. As here shown, the apparatus is of the general type known as a steam air-compressor, but specially designed and proportioned so that only a portion of the normal gross power developed in the power end shall be used in the work of compression. It may be of any style of design. The style here selected to illustrate is that known as the straight-line, but power is deliverable from off the crank-shaft for useful work in addition to that taken in compression.

1 is the power end of the machine, in all respects similar to a steam-engine, with cylinders, preferably but not necessarily compound, steam-chest, governor, reversing-gear, etc., etc., of any preferred standard type. 2 is the compressor end, preferably a compound air-compressor similar essentially to high-class apparatus of this type. 3 is an auxiliary compressor, separate from 2 and used for compressing gas.

4 and 5 are conduits leading from the delivery-outlets of 2 and 3 respectively.

Connected with 4 and 5 are reservoirs 6 and 9 for storing the fluids compressed by 2 and 3. These reservoirs are preferably placed in side connection with the conduits 4 and 5, as shown, and may at times be provided in multiple to advantage, as shown on the drawings by 6, 7, 8, etc.

Conduits 4 and 5 are preferably led by the shortest possible path, through a regulator or resistance-valve 12, in which they are, however, kept quite separate;
thence to a suitable burner 13, where for the first time the two conduits unite in a single combustion-chamber 14 (Fig. 3). From 14, as shown in Fig. 3, the now united conduits continue through the tube 15, around its lower end, into the chamber 16, called the cooling-chamber, thence upward through the annular passage 17, the annular chamber 18 and through the engine-pipe 19, to the throttle-valve 20 and the engine 1.

21 is a small steam-boiler, preferably of the water-tube type, connected with 16 as shown, in such manner that water shall always stand at practically the same level in 21 and 16. A float 22 in 21 controls the height of the water by rotating a shaft 23, shown in end view in Fig. 3, which operates a valve, whereby the water supplied by a pressure-pump or equivalent apparatus is controlled. A fire of any suitable character, provided as here illustrated by a burner 24, serves to raise steam."

25 and 26 are stop-valves, and 27 and 28 are check-valves in the conduits 4 and 5 respectively, placed near the burner 13, in relation as shown. The check-valves 27 and 28 open inwardly toward 13.

A broad description of the operation of the apparatus is as follows:—

Main inlet-valves 25 and 26 having been closed, and water having been admitted to 16 and 21 and connected parts, up to the level predetermined by the set of the float-valve, steam is raised in the usual manner. 16 and 21, with the connected spaces below check-valves 27 and 28, constitute a small steam boiler, bottle-tight for the moment. A suitable pressure being attained, the engine is started by opening the throttle and admitting steam to it, whereby air and gas are compressed in their respective reservoirs, or some of them. Suitable reservoir pressure having been obtained, and steam pressure a little in excess of said reservoir pressures having been obtained in 16 21, etc., inlet-valves 25 and 26 are opened. The check-valves 27 and 28 below them prevent the mixture of steam with air and gas. When the pressure in chambers 16 and 21 has fallen to the point of the now rising reservoir pressures, check-valves 27 and 28 open, and air and gas flow into combustion-chamber 14. There they are instantly ignited by suitable means to be described, and thereafter, burn continuously under super-atmospheric pressure, the flow of the burning and burned gases being downward through 15, around its lower end, immersed in water, up past the outer surface of 15, and through the engine-pipe 19 to the throttle.

The combustion in 14 and 15 results in high temperature and greatly increased volume of the gases sharing in it. This temperature is reduced in the water to about the temperature of saturated steam at the pressure existing in the system, and a considerable volume of steam is added to the combustion-gases thereby. The last named mixture is powerfully superheated during its passage through 17 and 18, yet not to such degree as to do damage to the engine parts. This superheating is also a jacketing of 14 and 15, and effectively prevents the evil results in those parts of excessive temperature. The energy of these pressure gases thus heated is so great as to furnish power in the engine mechanism for the continued work of compression, and also abundant excess power for outside work. After the ignition of gases in the chamber 14 has been made, the boiler flame under 21 may be discontinued.

Returning now to the operations of compression, it is important that the pressures in the two systems 4 and 5 be controlled in their relationship to each other. This is accomplished, first, by a selection of compressor proportions such as will give approximately, under normal running conditions, the relative volumes required. The gas-compressor is preferably so designed that it can give volumes somewhat in excess of requirements. Compressed fluids passing through conduits 4 and 5 reach, according to one of the methods of design, a differentially-operating balance mechanism 29, by the branch-pipes 30 and 31. This mechanism may consist, as shown in Fig. 1 and in greater detail in Fig. 10, of a diaphragm 32 operating two piston-valves 33 and 34, which block the further passage of the contents of the branch-pipes 30 and 31, respectively, whenever the diaphragm is in its central position. The chambers 35 36 adjacent to the diaphragm are open to 30 and 31. If, now, the result of compressor operations shall be an excess of pressure in either chamber 35 or 36, the diaphragm moves conformably, and the pressure which is in excess is for the instant released. Air excess passing through 33 and the onward conduit 37 enters the main system at the burner 13, as will be further described. Gas excess, whenever it occurs, passing through the valve 34 and the release-pipe 38, finds its way thereby back to the gas main approaching the suction 39 of the gas compressor.

An alternate method of accomplishing the above last-described result is illustrated in Fig. 12, the air-and-gas pressure approaching this mechanism by pipes 30 and 31 as formerly, enter air and gas chambers 40 41, respectively, separated by a water-seal, which traverses a connecting pipe 42. Chamber 41 is vertically movable, and counterbalanced by a weight 53. Inlet, outlet, and water-seal pipes 31 38 and 42, connected with the chamber 41 are made flexible to allow for the vertical movement of said chamber.

If normal water-level is depressed, the weight of the water-chamber 41 is decreased, and the chamber rises upon the stationary needle-valve 44 supported by the standard 52 upon which the chamber is permitted to slide, this chamber being slightly overbalanced by the weight 53 when water-level is in equilibrium. The rising of the chamber and the opening of the needle-valve release excess pressure until water returns and the weight which it adds causes the chamber again to sink, and the release-valve to close.

Another method of pressure-control consists in the regulation of the outputs of fluid supplied by the compressor apparatus. A differentially-operating device for accomplishing this in connection with the gas-compressor is illustrated in Figs. 1 and 15, which differ slightly as to the connection of the differential clearance-controller with the gas-compressor cylinder, the controller being shown in Fig. 1 as in side connection with said cylinder, and in Fig. 15 as mounted directly on top of said cylinder. A diaphragm 54 is here shown, with pressure connection through a branch-pipe 55 between the chamber 56 above it and the air-conduit 4, and also with pressure connection through a branch-pipe 57 between the chamber 58 below it and the gas-conduit 5. This diaphragm actuates a stem 59, which may pass through a stuffing-box, or as it is here shown, simply through a close but not tight fitting case, into and through a chamber 60 closed at the bottom by a piston-valve 61 attached to 59; then on through a second chamber 62, to a valve 63 closing tightly downward upon a seat. Below 63, the passage closed by it opens directly into the gas-compressor cylinder 3. The pressure in 58 acts upward on the diaphragm 54 and downward on the piston 61, or in case of leakage past said piston, on the valve 63. If, therefore, the pressures in 56 and 58 are equal, and the diaphragm balanced, the downward pressure on piston 61 or valve 63 will normally tend to hold said valve to its seat. The downward pressure may be augmented by a spring 64.

In normal operation of compression, gas from the mains or other source of supply fills the cylinder 3 and is compressed therein, this last operation taking place without lifting the valve 63 from its seat. The cylinder clearance is hence at its minimum, and under this condition the volume compressed, per stroke of the compressor, is greatest. If, now, the result of this is a pressure in 5 in excess of that in 4 or a "differential" caused by the operation of the separate air-compressor, this excess is transmitted to the chamber 58 below the diaphragm, and 63 is raised by the compression in the cylinder 3 at the end of the compressor-piston stroke. This opens chamber 62 to the clearance space of the cylinder 3, and according to its capacity relatively to that of the normal minimum clearance of the cylinder 3 itself, so is the quantity of 3's delivery diminished. In other words, by increasing the cylinder-clearance of the compressor, its output of fluid is decreased. If, still, pressure in 5 and 58 is excessive, 61 by the further upward motion of 54 is made to open up the further clearance-space 60 to the cylinder. Obviously, any number of clearance-increases, and any fineness of gradation for the excess-pressure which shall successively open them up is practicable. The stop-valves 143 and 144 in branch-pipes 55 and 57 are adjustable so as to allow only a small flow of fluids past them, with the result that the thrust of the valve 63 is cushioned, and any sudden excessive movement thereof is prevented. A similar set of chambers and valves may be operated by a spindle and diaphragm similar to 59 and 54, in connection with the air-compressor cylinder, if desirable. Thus the pressure-relationship between fluids in 4 and 5 may be completely controlled. This relationship need not be that of equality. A different set to the springs in the air and gas clearance controllers will effect departure from pressure equality in the two systems, and this can also be effected in various other ways.

Volumes furnished through conduits 4 and 5 preferably take the shortest possible path to the burner apparatus. Reservoir capacity for storage is desirable, and may be provided for by the means of side-outlets to the necessary reservoir-chambers 6, 7, 8, 9, 10, 11, the valves 65, 66, 67, etc., in the pipes leading to the chambers, permitting the chambers to be thrown in or out of use at will. These chambers are preferably arranged in multiple, as shown, it being desirable that the available reservoir capacity be variable. If 6 alone is open to the conduit 4, pressure rises in it to the pressure of the conduit. 68 is a stop-valve, and 69 a special valve the principle of which is indicated in detail in Fig. 16, being a valve so constructed that when a selected pressure is reached, and not before, it shall open and release into its chamber 7, permitting the pressure in chamber 7 to rise, and thereafter remain the same as in 6, until pressures again subside for any cause to the selected point determined by valve 69. Said valve 69 comprises a balanced valve 70, held to its seat by a spring 71 and opening toward the chamber 7. A diaphragm 72 operated by pressure from the chamber 6 is adapted to raise valve 70, and the latter will open and close uniformly according to the amount of the pressure antecedent thereto, and not spasmodically. Other valve arrangement is possible, to effect the end described. A similar construction 73 connects 8 to 7. 74 is a blow-off valve, the like of which may be applied to any or all of the chambers. 74 may be arranged to blow off at a selected maximum pressure. 74, if designed upon the principle shown in Fig. 16, or as an ordinary high-pressure safety-valve, prevents a rise of pressures indefinitely. On the other hand, 75 and 76 represent check-valve connections between the three chambers shown, these valves being so arranged as to open only in the direction contrary to the permissible flow in the lower connections last above-described. Stop-valves 67 and 140 being shut, it is thus made possible to blow off chamber 8. Then if 67 is opened and 77 in the main conduit 4 closed, the compressor 2 has an empty chamber 8, into which to throw its volumes when first started. When pressure in this chamber 8 has risen to the pressures which may have been stored in the other chambers, the check-valve 75 opens automatically, and the flow becomes continuous. During this process, the pressures in 7 and 6, or either of them, have served to perform the duties for which compressor-pressures are required, while the load upon the engine has been temporarily lessened. A similar arrangement, giving similar results, is applicable to the chambers attached to the conduit 5, as shown.

Further, it may be desirable that pressures shall be graded in the separate chambers attached for storage to 4 or 5. Special valves 78 and 79 accomplish this. Their action is similar to that of resistance-valve 12 to be now described, and by means of them any selected difference of pressure may be established between the chambers between which they are placed, this difference being maintained automatically, as soon as and so long as any flow occurs through said chambers and valves. Similar valves are illustrated, similarly placed in connection with the chambers branching out from conduit 5. The stems of these valves may, if desirable, be rigidly connected, so that the motion of 78 may be in strict unison with that of the valve symmetrically opposed to it in the drawing, which controls the pressures of the fluids in chambers 11 and 10. The whole purpose of this last-described arrangement is to establish a series of connected pressure-levels in the several chambers, from any one of which air or gas or both may be drawn.

The valve 78 may be any suitable type of reducing valve. When these valves are in action for the purpose of grading the pressures in the reservoirs, the whole flow is of course through the valves. Thus if all three of the reservoirs 6, 7, 8 are to constitute the graded series, the valves 77 and 66 will be closed and the valves 67 and 65 opened so that the fluid flows from the conduit 4 through the reservoirs 8, 7 and 6 in the order named and back to the conduit in a loop, being reduced in pressure in each passage between two reservoirs, the intermediate portion of the conduit 4 being for the time cut out of service.

From between the valves 75 and 78 in Fig. 1 pipes 200, containing stop-valves 201 are seen leading upwardly to the air-conduit 4 and corresponding pipes from the gas-reservoirs, whereby any reservoir, such as 7, may if desired be arranged to discharge directly back to the conduit when conduit-pressure falls below the reservoir-pressure.

Conduits 4 5 open directly into a special resistance-valve 12 containing two pressure-reducing mechanisms connected to operate in unison and controlled differentially by the pressure in the combustion-chamber and the pressure created by one of the compressors. (Figs. 1 and 2). In this valve (Fig. 2), 80 and 81 represent the entrances of conduits 4 and 5, respectively. Air-pressure is thus brought to the top side of the diaphragm. It also passes up through ports 82 placed in the body of a piston-valve 83, which piston-valve controls the passage of air out through the ports 84 and down into the outlet 85, which is the outlet continuation of the general conduit 4. Similarly, fluids arriving through 81 are controlled by piston-valve 86 in their passage out through ports 87 into outlet-pipe 88, which is the continuation of the conduit 5. Pistons 86 and 83 are rigidly connected to a stem 89 operated by a diaphragm 90, and are so placed in the valve that they simultaneously cut off in equal proportions the flow of fluids through the ports 84 and 87, respectively.
No mixture of these fluids occurs in this valve. The ports 84 and 87 are alike in their dimensions individually, and the numbers of them are in whatever ratio has been predetermined as desirable for the respective volumes of air and gas. The under side of the diaphragm is connected by pipe 91 to the upper portion of the chamber 16 to be hereafter described. A spring 92 holds the diaphragm up and the piston-valves shut, when the valve is not in operation. This spring is adjusted to a tension giving a difference between the pressures on the upper and the lower sides of the diaphragm equaling any selected number of pounds per square inch. The operation is as follows: The arriving pressures at once depress the diaphragm, open the ports, and permit onward passage of fluids. If these fluids are not barred by obstacles further on in the conduits, the pressure reaches the chamber 16, and through the pipe 91 reaches the under side of the diaphragm. When this latter, here designated as the "terminal" pressure, shall approach the conduit pressure, here designated as the "initial" pressure, acting on the upper side of the diaphragm, within the difference represented by the tension of the spring 92, the diaphragm and pistons will rise, and will take such position relatively to the respective ports that the respective fluids are simultaneously and proportionately cut off in such measure as shall throttle the flow into the chamber 16, and reduce the pressure there and in the pipe 91 and the lower diaphragm-chamber as far as may be needed to resist the upward movement. The spring 92 therefore becomes, as already explained, the measure of the difference between the initial and terminal pressures. If initial pressures rise, the terminal pressures follow at the distance of this difference, and the corresponding result occurs when initial pressures fall, the action of the valve being entirely independent of the amount of pressure. It is pre-supposed in the above that at least a slight vent and flow out of chamber 16 is taking place either through the engine or through the auxiliary vent to be hereinafter described. If onward outlet from terminal chamber becomes entirely closed, rise of pressure in the terminal chamber will ultimately make terminal and initial pressures equal. A constant-reduction regulator of the kind just described, although believed to be new with me, is not herein claimed broadly, being made the subject of a separate divisional application, Serial No. 324,616. In connection with a constant-pressure internal-combustion motor system, however, it has useful offices. It establishes an initial pressure superior to the combustion-chamber pressure, which may be tapped off for a pilot light in said generator. Also by placing this regulator near the burner as shown, it tends to promote mixture of the burner fluids by virtue of the velocity of the fluids in passing its orifices, and tends to prevent back-fire. It may be used to grade reservoir pressures (as by making the regulator valves 78, 79, etc. like the regulator valve 12). It may be used to regulate the two burner fluids simultaneously with a single diaphragm or septum as already described. Passing on from this valve to the conduits, as shown in Fig. 1, the still separated fluids pass through stop-valves 25 and 26, through check-valves 27 and 28, opening onward, and so into the burner-head 12 and its combustion-chamber 14, where for the first time the fluids come together.

Details of different burner-head arrangements are shown in Figs. 3, 6, 7 and 9. In Fig. 3, the air arriving through 4 is made to freely flow and jacket the upper portions of the burner, through passages 93, etc., reaching to 94. 14 is the combustion-chamber itself, with walls removable and renewable. 15 is the separate removable and renewable combustion tube or extension of this chamber. 95 is a short, removable, renewable cylinder, permissibly of some refractory substance. 96 is a piece which as shown by 104 is pierced horizontally by radial passages, at right angles one to another, opening from 14 to the outer cylindrical surface of the piece 96. This piece rests upon suitable packing 97, supported by the framework of the head, and is packed at that point and also by packing 98 at its upper edge. A nut 99 clamps the whole in place, the piece 96 being so made as to be removable upward from the outside shell of the head 13, upon removal of the nut. With it is removed the tubular passage 15, and all other parts connected to 96. Air arriving from the conduit into chamber 94 has entrance through passages 100 and 101, into combustion-chamber 14. These passages are variable in size, by means of rings 102 103 as shown, which open and close over their respective passages. By this means, any desirable division of the arriving air between these two sets of passages may be made, and thereafter maintained. 104 is one of the radial passages already described, opening into combustion-chamber 14. Opposite its extremity in the main shell, is a hole and a tubular extension 105, ending in a peep-hole closed in by transparent material suited to resist pressure. Similar openings in the outside shell may be placed opposite to the other lateral passages from 14, to be used for the last-described or other desirable purpose. It will be noted that the joint of the combustion tube 15 is made with the piece 96 at a point below these lateral passages, rendering a pressure-tight joint attainable. In Fig. 17, a suitable construction for the peep-hole tube 105 is shown. 145 is the peep-hole, located at the outer end of said tube and covered by a transparent or translucent piece 146, of a material such as glass, suited to resist pressure. In case the piece 146 should be destroyed, giving an outlet to the pressure in the combustion-chamber, provision is made for automatically closing said outlet, said provision taking the form in the drawing, of a valve 147 in the passage approaching the peep-hole 145, said valve normally lying open but having such a position that an outrush of gas will close it against a valve-seat 148, and thus close the passage.

Gas arriving through conduit 5 enters the combustion-chamber through passage 106, in such manner as to be joined first by some of the air arriving through 4, as described, through passage 101, and subsequently by more air mixing with the first mixture through passages 100 and 107, which latter are preferably a series of holes converging toward a focus. Through the center of 106, as is here shown, a spur igniter-tube 108 is extended, terminating about at the point where the mixture of fluids occurs. This construction is shown in further detail in Fig. 4, in which 4 5 are the entrance-conduits, 106 the gas-passage, as described. 109 is a gas-passage from a separate small burner of any suitable type. Into this passage 109, as here illustrated, air is forced under some pressure, through a separate nozzle 110 fed from any source of air-pressure supply. The different fluids advancing through 109 mingle, and flow back through the annular passage between 109 and 108, at the outlet of which they may be ignited, the flame burning back to the extremity of 109, where a high temperature quickly ensues, the extremity of the tube 108 becoming highly heated and incandescent. In this arrangement, the backward-flowing hot gases jacket and pre-heat the onward-flowing combustible, increasing the vigor and controllability of the combustion. 111 is a nut, threaded upon 108 above the packing of the stuffing-box 112 through which 108 is made to pass, and by means of it 108 and its interior parts may be withdrawn a certain distance through the interior of the passage 106, and thus carried back after it has performed its service, out of reach of the heat of the combustion-chamber 14. The lower end of tube 108 when fully projected is substantially within the zone of the passage 104 and its firing point within view of the peep-hole tube 105. It also acts as a baffle against which the stream of combustible mixture impinges. Should this flow be so great as to chill the hot-tube to an extent preventing ignition in starting, the output of the compressor or compressors may in part be temporarily diverted into one or more individuals or pairs of the reservoirs 6, 9 etc., so as to diminish this flow and the chilling effect.

The lower end of the tubular passage 15 is preferably serrated, as shown at 113. By this means, when water-levels are for any reason lowered, the opening for the passage of unquenched gases is at the first small, and subsequently subject to gradual increase, if water-level continues to drop, which feature has been found advantageous, as for example to control the superheating effect by admitting more or less of the unquenched gases to chamber 17.

Passages 17 and 18 carry the quenched and now reheating gases along the surface of 15 to the engine-pipe. In the above-described arrangement of burner-parts, it is to be noted that while 15 is jacketed by the superheating engine-bound gases, the upper portions of the burner-head 14, 96, etc., are jacketed by dry incoming air. An arrangement alternate to this is illustrated in Figs. 6 and 8, in which the whole of the surfaces immediately in contact with the combustion fluids are jacketed by the super-heating engine-bound fluids, whereby these surfaces are preserved and kept comparatively cool. In these figures, 114 is a piece corresponding to 96 in general character, but is provided with passages 115 through which the superheating gases pass still upward above the level of combustion-chamber 14 and on through chamber 94 into chamber 116, and so out toward the engine, through engine-pipe 19 located at the uppermost portion of the head. The lateral passages 104 are formed in bridges connecting the walls of the combustion-chamber with the outer walls of piece 114, as seen in Fig. 8. In this head, incoming air is brought down through chamber 117 annularly located about the passage 106. Ports 118 and 119 admit the air in a divided stream as before, to combustion-chamber 14, these ports being variable by a perforated plate 120, which when rotated upon its seat varies the dimensions of ports 118 and 119 to any desired degree.

Fig. 9 shows a still further varied construction of upper head, in general similar to the head first described in Fig. 3. Air is admitted through 4, and gas through 5. Air passes down through 101, or in through 121, the latter port being variable by a valve and spindle passing through a stuffing-box to the outside. In this figure, occasion is taken to show an auxiliary burner. In Figs. 3 and 4, an igniter is shown in vertical central position, withdrawable. It is plain that this same igniter may be placed horizontally in radial direction, at any one of the four openings in the outside shell, one of which is shown as used for 105 in Fig. 6. The above-described igniter so horizontally placed would then protrude into chamber 14, while performing its ignition, this time just below the confluence of gases, and after ignition would be retired in the manner described. But the auxiliary burner illustrated in Fig. 9 is a tube 122 through which an auxiliary supply of gas and air in proper proportions and preferably under a super-atmospheric pressure slightly greater than the combustion-chamber pressure, are brought to the combustion-chamber 14, from one of the high-pressure reservoir-chambers 8 11, etc., in each series. 149 and 150 represent the pipes conducting the gas and air to the tube 122, in which latter they are intermixed. Said pipes may be continuations of the pipes 151 and 152 shown in Fig. 1 as connected with the several gas and air reservoir chambers by valved branches. The working pressure of the system, for either fluid, will ordinarily be the lowest pressure in any of the reservoirs storing said fluid; and since the pressures in said reservoirs are capable of being graded, as hereinbefore explained, the fluids for supplying the tube 122 may be taken from the reservoirs having the higher pressures. It is also permissible to take them from the main gas and air conduits, preferably on the initial side of the valve 12, which can easily be done through the reservoirs 6 and 9 by opening the branch valves 65. Arrangements consisting permissibly of a heat-muffle 123 and an atmospheric flame 124, the same being placed as near as possible to 14, serve to heat the tube 122 to redness from its exterior. The fluids passing through this tube are thereby ignited and borne onward into chamber 14, the resulting minor flame serving to ignite the main combustible when first admitted. After ignition, flow through 122 may be discontinued, or may be maintained, in which latter case the small flame remains burning in 14, even if the main flow of combustible through 5 is stopped. The functions of the igniter 108 and of the auxiliary burner 122 are not, in the main, alternative, although by applying external heat to the tube 122 in a sufficient degree to heat it to redness, the auxiliary burner may be used as an igniter, and other igniters dispensed with. The flame supported by fluids entering through the tube 122 has an important office in keeping the whole apparatus, including the water in the cooling-chamber, hot and in condition for an immediate start, when the supply of combustible to the main burner is entirely shut off and the engine stopped.

Cooling-chamber 16 is connected with its adjunct steam boiler 21, as shown in Fig. 3, the connection being such that constant circulation of water shall take place. By means of the connecting pipe at the top of the respective chambers, the pressures in 16 and 21 shall be always maintained equal. As a result of this, the water in the two chambers stands always at the same level. Opening upward from 21 is a passage 125 connecting with the engine-pipe 19, in which may be placed a thermostat, designated 126 in Fig. 5, consisting as there illustrated, of expansible metal pieces varying in their expansibility and connected by means of a rod 127 through the open connecting pipe surrounding the rod, with the fulcrum 141 of the lever carrying the ball-float 22. This rod does not need to be in any way packed in its surrounding tube 125, but the tube is a close fit upon the sliding rod, so as to prevent the passage through it of any appreciable volume of engine-bound gases. The ball-float is connected with the shaft 23, which regulates in any one of the usual methods, the permitted inflow of water from the source of water-pressure to the chamber 21, whereby the normal level of water in the chambers is determined. The length of the rod 127 may be varied by altering connection 128, whereby the normal position of water-level can be altered. Or this may be effected by adjustment upon the shaft 23, where 23 is connected with the boiler-pump or source of water-pressure. In addition to this variation, the temperature of engine-bound fluids in 19 is made to affect the water-level, by raising or lowering rod 127, and the fulcrum 141 of the ball-float. If the temperature in 19 rises, the water-level is thus made to rise, the limit being simply that established by the dimensions of the parts. In consequence of this rise of water-level, the effective length for super-heating of the tube 15 is lessened, the super-heating surface is correspondingly lessened, and the temperature accordingly reduced. With proper construction, this rising of water-level may be carried, if desirable, slowly upward to the very burner itself, in consequence of which no super-heat at all would occur.

The variation of water-level, thermostatically or manually, may as heretofore mentioned, be carried to the extent of uncovering the upper angles of the serrations 113 at the lower end of combustion-tube 15, though I do not claim this feature in the present application.

In connection with the chamber 16, and as illustrated, in flexible connection through the flexible pipes 129 130, a separate chamber 131 is provided, in which the water is made to stand at the normal water-level of chamber 16. This whole chamber is suspended by a flexible connection leading to the spring 92 of the resistance-valve 12, as shown in Fig. 1. The upward tension of spring 92 may therefore be made to depend upon the weight of 131, and as the water-levels rise, the weight of 131 and consequently the tension upon the spring 92 increases. By this means, the added resistance to the passage of fluids consequent upon the increase of the depth of water in the pipe 15 is neutralized by the increased difference between the initial and terminal pressures effected immediately by resistance-valve 12 when its spring tension is increased, so that no alteration in the effective difference of pressures governing the onward flow of air and gas from the conduits 4 and 5 into the combustion-chamber 14 occurs, whatever may be the change in water-level. In other words, the two pressure-drops, one imposed by the valve-mechanism 12 and the other by the head of water in the combustion-tube, are so controlled that one is made to depend on the other. 132 is a plug placed in the bottom of the chamber 16, the general position of which is preferably vertical. Through this plug may be taken, from time to time, any sediment which shall occur, and all harmful foreign substances may through the cleanout 132 from time to time be extracted.

Further provisions against any possibility of temperature-rise in undesirable quarters is made by the devices shown in Figs. 13 and 14. In Fig. 13, 133 is a fusible wire stretched across the engine-pipe 19, having its exit through a stuffing-box and connected in such manner to the stop-valve 26 of the fuel-conduit 5 that any breakage of 133 shall result in the closing of the valve. Undue temperature-rise thereby results in the complete shutting off of all fuel. In the alternate illustration, Fig. 14, the fusible wire 134 is made to support in open position, a check-valve 135, which closes in the direction of the onward flow. If the fusible wire is displaced, this check-valve in pipe 19 closes, and all combustion is stopped, because the combustion-chamber is robbed of all vent.

Reverting to Fig. 1, 136 is a by-pass or blow-off pipe from the engine-pipe to the engine-exhaust or to the outer air. 20 is a throttle-valve connected to a valve 137 in the pipe 136 in such manner, by means of a slip-link 142, that before 20 can be absolutely closed, 137 shall open at least slightly. This connection is so arranged that it can be easily severed. If not severed, the timely opening of 137 as described prevents the combustion-chamber from being robbed of all vent in case the engine is momentarily completely shut down.

In Fig. 1, the rock-lever 139, driven by the motion of the engine, is provided with an adjustment whereby the position on said lever, of the connecting-rod driving the piston in compressor 3, can be varied. As the position of this connecting rod is altered, so is altered the stroke of the piston in 3. The result of this change is necessarily an alteration in the delivery of gas to 5. By this means, if 3 is built as hereinbefore specified, so as to give compressed gas somewhat in excess of requirements, any quantity less than the maximum thus arranged for may be obtained by the set of the adjustment 138.

In Fig. 18, I have illustrated a mechanism for utilizing the released fluid-pressure from a balance mechanism for performing useful work. Said balance mechanism may be the balance mechanism 29 hereinbefore described, and the work performed may be the control of compressor-cylinder clearance by a mechanism such as illustrated in Fig. 15. Fig. 18 represents an apparatus thus organized. The gas pressure from the release-valve 34, which is actuated differentially by the balance diaphragm 32, reaches, through the release-pipe 38, a chamber 58 located beneath a diaphragm 54, the latter being connected with the stem 59 of a valve 63 which controls the clearance of the gas-compressor cylinder 3. A spring 156 and the pressure of the atmosphere acting on the upper side of diaphragm 54 normally hold the valve 63 to its seat, but when the release-valve 34 opens, the pressure of the main gas-conduit 5 is introduced to the under side of the diaphragm, and the valve 63 rises, increasing the cylinder clearance of the gas-compressor and correspondingly decreasing its output. Final release occurs through a pipe 157 controlled by a valve 158 which is adjusted so as to afford a greatly contracted passage for the fluid. Obviously, a similar clearance-controlling mechanism operated by the air-release may be applied to the air-compressor. It is also evident that other useful work may be performed by the released excess pressures of either or both combustion-fluids, such as pumping water into the cooling-chamber, or driving an engine-piston.

Fig. 11 represents a modification of the pressure-regulating valve shown in Fig. 2, by which the absolute or relative aggregate areas of the two sets of fluid-exit ports of the valve may be changed. Either or both of the valve pistons 83 86, in this case the piston 86, is provided with ports 154 corresponding in number to the outlet-ports 87, one side of each of said ports 154 being parallel to the corresponding side of each of the ports 87. The stem 89 to which the piston 86 is attached is jointed at 155, and the upper part is adapted to rotate frictionally on the lower part. Now by rotating the piston 86 so that the sides of its ports cut off more or less of the lateral area of the ports 87, the absolute aggregate areas of the latter, and hence the relative aggregate areas of said ports 87 and the air-ports 84, can be changed. This changes the relative resistances to the passage of the two fluids entering the burner, and affects their pressure relationship.

The pressure-regulating valve 12 acts as a resistance, establishing and maintaining a difference in pressure between the combustion-chamber and the compressor-conduits or reservoirs connected therewith, which insures the constant vigor of combustion. The location of this resistance at a point between the burner and the sources of pressure, instead of directly at the burner (though preferably not so far away from the burner as to lose control of the velocity of flow at the burner), interposes cushioning chambers or spaces between the burner and the resistance. Said chambers, as herein shown, comprise principally the pipes connecting the burner with the resistance-valve, but these may be added to or enlarged, to afford extra cushioning or equalizing space. The effect of said chambers is to partially equalize the pressure fluctuations due to the intermittent "take" of the engine, before the valve 12 has had a chance to act. Each out-draft from the combustion-chamber, due to a receding stroke of the engine-piston, causes a decrease of pressure in the combustion-chamber, and an appreciable though very short period of time elapses before this decrease in terminal pressure is felt by the valve and compensated for by a wider opening of its ports. Conversely, the momentary increase of terminal pressure due to cut-off at the engine is not instantly responded to by a decrease in the valve-port area. In consequence of this condition, there would be a normal tendency of the flame in the combustion-chamber to fluctuate, were there no reservoirs of combustion-fluids at mean terminal pressure, back of the burner, to draw upon. By interposing such chambers, the tendency to fluctuate may be largely overcome.

With regard to the valve 12, it is to be further noted that its pressure-reduction by a constant difference is maintained irrespective of the quantity or velocity of flow of the pressure-fluids through the valve. The engine at slow speed may call for only a very slight flow of the combustion-fluids through the valve, in consequence of which the friction, and hence the actual resistance due to a given port-area in the reducing-valve, would naturally be diminished. The valve maintains the actual resistance in this case, by reducing the port areas.

The balance mechanism 29, in connection with the air by-pass 37 which terminates in the outlet from the combustion-chamber 14, effects a novel regulation, the principle of which may be thus explained: It is assumed that the air and gas compressors are so designed that their outputs are in a predetermined ratio. Let it also be assumed that the pressures in the main conduits 4 and 5 are to remain equal, and it is then evident that the areas of the air and gas ports in the valve 12 must have the same ratio as the outputs of the compressors. In the arrangement shown, this ratio when once established, remains fixed during any period of operation of the valve, and therefore if the outputs of the compressors vary from the predetermined ratio, the one in excess will tend to produce an excess of pressure in its conduit. Said excess is disposed of by the balance mechanism 29, the excess gas in the arrangement illustrated being returned to the original source of gas-supply, and the excess of air being by-passed into a receptacle containing terminal pressure. Now in the case of the air, an over-production on the part of the air-compressor increases the predetermined ratio of its output to the output of the gas-compressor, and because of the fact that both the air-main 4 beyond the valve 12 and the by-pass 37, deliver into a terminal pressure receptacle, the total air-port area must be increased by an opening of the air-release valve 33 in the balance mechanism until its ratio to the gas-port area shall be the same as the actual ratio of compressor-outputs. These changing ratios are automatically maintained the same for the compressor-outputs and port-areas during excess air-output.

In Fig. 1, 159 represents a pipe connecting the engine-pipe 19 with the air-conduit 4 on the initial-pressure side of the valve 12, said pipe containing a check-valve 160 which opens back toward the air-conduit, and a stop-valve 161. The object of this construction is to provide practical means for utilizing the engine 1 as an air-compressor when subjected to negative load. When the engine is connected up to drive an apparatus which under certain conditions will itself act as a driver and propel the engine, this being the condition termed "negative load", the valve-gear of the engine can be reversed, and the latter will act as an air-compressor, receiving atmospheric air through its exhaust-pipe. In the event of the engine being thus arranged to act as a compressor under negative load, a back pressure will be established in the engine-pipe 19, and in the combustion-chamber 14, causing the check-valves 27 and 28 in the air and gas supply pipes leading to the burner to close. All connections between the combustion-chamber and the source of gas-supply will then have been shut off; but assuming the stop-valve 161 to have been left open, connection may be maintained through the pipe 159 and the air-conduit 4, between the engine and the air-reservoir chambers 6, 7, 8. The back pressure will open the check-valve 160, and the air compressed in the engine will then be stored as an additional reserve force in the said reservoir-chambers and the conduits open thereto.

The term "combustion fluid" employed in the claims is used generically to mean either the air-ingredient or the fuel-ingredient of combustion and not simply the fuel-ingredient.

I claim:—

1. In power-apparatus, the combination of an engine, a compressor driven by and supplying the engine, a fuel-burner connected with the compressed-fluid line for heating the engine-driving fluid, a reservoir in branch connection with the fluid-line for storing the fluid to lessen the load on the engine, and means for opening and closing the branch-connection.

2. In power-apparatus, the combination of an engine, a compressor driven by and supplying the engine, a fuel-burner connected with the compressed-fluid line for heating the engine-driving fluid, a plurality of reservoirs located between the compressor and engine for storing the compressed-fluid and supplying the engine, and means for connecting individual reservoirs respectively with the compressor and with the engine whereby one reservoir may be receiving compressor output while another is supplying the engine.

3. In power-generating apparatus, the combination of a fluid-compressor, a combustion-chamber connected therewith, a series of storage reservoirs, and means for automatically bringing said reservoirs in succession into communication with said compressor.

4. In power apparatus, the combination of a compressor, an engine to use the compressed fluid, a reservoir to store excess fluid during the operation of the engine, and automatic mechanism controlling the communication between said compressor and reservoir for admitting the fluid to said reservoir upon the attainment of a predetermined fluid pressure.

5. In power apparatus, the combination of a combustion-fluid compressor, a burner supplied thereby, a reservoir and automatic inlet mechanism therefor for storing excess quantities of the fluid during the operation of the burner, upon attainment of a predetermined fluid pressure, and automatic outlet mechanism for returning the stored fluid to the fluid-line between the compressor and burner when the pressure in said line falls below the reservoir-pressure.

6. In power apparatus, the combination of a compressor, an engine, a compressed-fluid-line connecting the two, a reservoir having inlet and outlet branch connections from said line, an automatic loaded entrance-valve in the inlet connection, and an automatic check-valve in the outlet connection opening toward said line.

7. In power apparatus, the combination of a compressor, internal-combustion power-developing means supplied thereby, a reservoir adapted to store the compressed fluid, and automatic mechanism controlled by the pressure in the fluid-line between the compressor and the power-developing means for controlling the inlet of fluid from said line to the reservoir and the exit thereof from the reservoir to said line.

8. In power-generating apparatus, the combination of a fluid-compressor, a combustion chamber connected therewith, a storage reservoir in branch connection with said compressor and with said combustion-chamber, and an automatic valve-device controlling the connection with the compressor and controlled by the pressure antecedent to said reservoir, said device constructed to open and close uniformly according to the amount of said antecedent pressure.

9. In power-generating apparatus, the combination of a combustion-chamber, a compressor for the combustion-fluid, a storage-reservoir for said fluid, a valve controlling admission to said reservoir, means exerting a constant valve-closing pressure, and a movable partition subject to the pressure antecedent to the reservoir for opening the valve.

10. In power apparatus, a main power-line including in series a compressor, a combustion-chamber, a loop branch leading from said power-line and returning thereto, and a pressure-reducing mechanism in said branch controlled differentially by the pressures initial and terminal to itself, whereby pressures may be graded in said branch in a predetermined relation.

11. In power-generating apparatus, the combination of a fluid-compressor, a combustion-chamber connected therewith, a series of reservoirs for storing the fluid, and means for automatically opening said reservoirs in succession without reducing the pressure in the preceding reservoir.

12. In power-generating apparatus, the combination of a fluid-compressor, a combustion-chamber connected therewith, a series of storage-reservoirs, means for automatically bringing said reservoirs in succession in communication with the compressor during rising pressures, and means for automatically maintaining them in communication with the combustion-chamber during falling pressures.

13. In continuous-combustion power-generating apparatus, the combination of a fluid-compressor, a combustion-chamber, a conduit connecting the two, a series of storage-reservoirs in branch connection with the conduit, passages connecting the reservoirs and provided with valves which open at different predetermined pressures, whereby the reservoirs are brought successively into communication with the conduit during rising pressures, and other passages connecting the reservoirs and provided with check-valves opening toward the conduit, whereby the reservoirs are maintained in communication with the conduit during falling pressures.

14. In power-generating apparatus, the combination of a fluid-compressor, a combustion-chamber, a conduit connecting the two, a storage-reservoir in branch connection with the conduit, a second storage-reservoir in branch connection with the conduit, means for independently discharging said second reservoir, and pressure-controlled means for automatically throwing said second reservoir into connection with the first reservoir.

15. In power-generating apparatus, the combination of a fluid-compressor, a combustion-chamber, an engine connected to drive said compressor and operated by the output of the combustion-chamber, a conduit connecting the compressor and combustion-chamber, a storage-reservoir in branch connection with the conduit, a second storage reservoir, means for independently discharging said second reservoir, and pressure-controlled means for automatically throwing said second reservoir into connection with the first reservoir.

16. In power apparatus, an internal-combustion generator having a main burner, a motor supplied by said generator, pressure fuel and air conduits supplying the burner and having automatic check-valves opening toward said burner, and an auxiliary steam-boiler connected with said motor and having an independent burner for heating it.

17. In continuous-combustion power-generating apparatus, the combination of a combustion-chamber, means to supply combustion-fluids thereto under pressure, an outlet from said chamber for the products of combustion, a by-pass connected with said outlet and adapted to divert one of said fluids around the combustion-chamber, a valve controlling said by-pass, and a device controlled differentially by the pressures of the fluids for operating said valve.

18. In power apparatus, the combination of a compressor, a combustion-chamber for using the compressed fluid, and means located between said compressor and said combustion-chamber and controlled differentially by the pressures initial and terminal to itself for reducing the pressure of the compressed fluid by a predetermined amount independent of the absolute pressure.

19. In power apparatus, the combination of a combustion-fluid compressor, a burner supplied thereby, and a pressure-reducing means in the supply-line controlling the velocity of fluid at the burner and controlled differentially by the pressures initial and terminal to itself.

20. In a constant-combustion power-system, the combination of a combustion-chamber having a pilot burner, a pressure line to supply combustion fluid to said chamber, a regulator in said line, controlled differentially by the pressures initial and terminal to itself, and a conduit leading from the pressure line on the initial side of said regulator for supplying the pilot burner.

21. In continuous-combustion power-generating apparatus, the combination of a combustion-chamber, means to supply combustion fluids continuously thereto under pressure, two connected valves controlling the respective fluids and controlled differentially by the pressures initial and terminal to one of them, and means for varying the relative openings of said valves.

22. In power apparatus, the combination of air and gas compressors, an internal-combustion burner supplied thereby, and pressure-reducing valve-mechanism in the compressed air and gas lines controlling the velocity of said fluids at the burner, and controlled differentially by the pressures of one of the fluids initial and terminal to said mechanism.

23. In continuous-combustion power-generating apparatus, the combination of a combustion-chamber, two sources for supplying combustion-fluids to said chamber under pressure, means for automatically maintaining the pressures of said fluids in a predetermined relation, and two automatic pressure-reducing valves interposed between said sources and the combustion-chamber and connected to operate in unison, said valves being controlled differentially by the pressure in the combustion-chamber and the pressure from one of said sources.

24. In power apparatus, the combination of an internal-combustion burner, means for supplying compressed air and gas thereto in a predetermined pressure-relationship, resistance-valves in the air and gas lines having orifices in a relationship corresponding to the desired ratio for the quantities of air and gas participating in combustion, and means controlled by the pressure of the system for so varying the opening of said valves in common as to afford a substantially constant resistance for each fluid.

25. In continuous-combustion power-generating apparatus, the combination of a combustion-chamber, means for supplying air and gas continuously thereto under pressure, and valves in the supply-conduit controlled differentially by the pressures initial and terminal to said valves and located far enough in advance of the mixing-point of the fluids to provide cushioning chambers between said valves and the combustion-chamber.

26. In continuous-combustion power-generating apparatus, the combination of a combustion-chamber, means for supplying combustion fluids continuously thereto under pressure, means controlled by the pressure of the system for automatically varying in common the orifices for passage of the said fluids, means for relatively varying said orifices, and automatic means controlled differentially by the pressures of the fluids back of the orifices for releasing said fluids from the conduits.

27. An internal-combustion steam-and-gas generator, means for superheating the steam in the output of said generator, means for supplying a pool of water in said generator whose level determines the amount of superheat, an automatic level-controller for said pool, and means controlled by the temperature of the generator output for varying the level established by the controller.

28. An internal-combustion steam-and-gas generator having a combustion-tube, means for establishing a pool of water immersing the outlet of said tube, means for carrying the steam and products of combustion in superheating relation with the outer surface of the combustion-tube, and means controlled by the temperature of the steam-and-gas mixture for varying the water-level in said generator.

29. In continuous-combustion power-generating apparatus, the combination of a pressure combustion-chamber, conduits antecedent and terminal thereto, means for establishing resistance to the flow through said conduits and chamber at points antecedent and terminal to the point of combustion, and controlling devices for said resistances dependent the one upon the other.

30. In continuous-combustion power-generating apparatus the combination of a combustion-chamber, a cooling-chamber having water-supplying means, means to supply combustion-fluid to said combustion-chamber, means to automatically impose a pressure-drop upon said fluid, and means controlled by the water-level in the cooling chamber for varying the amount of said pressure-drop.

31. In continuous-combustion power-generating apparatus the combination of a combustion-chamber, a cooling chamber appurtenant thereto and having water-supplying means, a valve controlling admission of combustion-fluid to the combustion chamber and differentially controlled by the pressures initial and terminal to itself, and means controlled by the water-level in said cooling-chamber and exerting a yielding mechanical pressure on said valve in aid of the terminal pressure.

32. In continuous-combustion power-generating apparatus, the combination of a source of fluid-pressure, a combustion-chamber connected therewith, a cooling-chamber containing a body of water to cool the products of combustion from said combustion-chamber, a re-heating surface of variable area controlled by the level of the water and by which said products are re-heated, an automatic pressure-regulating valve mechanism interposed between the source of pressure and the combustion-chamber, and a device forming a part of said valve mechanism for controlling the relation between its initial and terminal pressures and controlled by the level of the water in the cooling-chamber.

33. In continuous-combustion power-generating apparatus, the combination of a combustion-chamber having an atmospheric vent, means to supply combustion-fluid to said chamber, and a valve controlling the fluid and controlled differentially by the pressures initial and terminal to said valve.

34. In continuous-combustion power apparatus, the combination of a burner, means to supply pressure combustion-fluids thereto, a combustion-chamber, a cooling-chamber in the path of the products of combustion for vaporizing water, a main outlet from said cooling chamber for conducting the steam and gases to an engine, an atmospheric vent-outlet from said cooling-chamber, a vent-valve, a valve controlling the main flow of fluid through the combustion-chamber, and a connection between said valves whereby the opening and closing movements are respectively opposite in the two valves.

35. In internal-combustion power-generating apparatus, the combination of a combustion-chamber, a water-supplied cooling device subject to the heat of said combustion-chamber, an engine, a conduit structure for conducting the products of combustion and steam from said chamber and said cooling device to the engine to operate the latter, and a throttle and vent valve-mechanism located between the cooling device and the engine and having means for closing the passage to the engine and opening a vent from the combustion-chamber by a single operation.

36. In continuous-combustion power-generating apparatus, the combination of a combustion-chamber, a cooling-chamber communicating therewith, a superheating passage leading from said cooling-chamber and heated by the main combustion, and means controlled by the temperature of the output from said chamber for controlling the proportion of the heat of combustion imparted to the steam after its generation in said cooling-chamber.

37. In continuous-combustion power-generating apparatus, the combination of a combustion-chamber, a cooling-chamber containing a body of water adapted to cool the products of combustion from said chamber, a re-heating surface for re-heating the cooled products and variable by differences in the water level, an outlet for the re-heated products of combustion, and a thermostat controlled by the temperature of the products passing through said outlet and controlling the water level.

38. In constant-pressure power apparatus, the combination of a continuous internal-combustion burner, means to supply combustion-fluids thereto under pressure, a combustion-chamber, and an igniter movable into and out of the region of the flame from said burner.

39. In continuous-combustion power-generating apparatus, the combination of a combustion-chamber, means for supplying combustion fluids thereto continuously under pressure, an externally-open blind igniter-tube in said chamber, burner-tubes in ejector-relation entering said igniter-tube, means to supply a blast of air through the air-tube, and means for supplying gas at a lower pressure to the gas-tube for entrainment by the air-blast.

40. In continuous-combustion power-generating apparatus, the combination of a combustion-chamber, means to supply combustion fluids continuously thereto under pressure, and an externally-heated hot-tube igniter adapted to be located as a baffle in the path of a combustible current entering said chamber, and having an adjustment for preventing the impingement of the main combustion flame during normal operation.

41. In continuous-combustion power-generating apparatus, the combination of a combustion-chamber, an engine connected therewith, means driven by the engine for supplying a combustible mixture of air and fuel under pressure to said chamber, an incandescence igniter in the path of one or more of the combustion fluids, and manually-controllable means for temporarily diverting the mixture from the combustion chamber to prevent chilling of the igniter thereby in effecting a start.

42. In continuous-combustion power-generating apparatus, the combination of a combustion-chamber, an engine connected therewith, means driven by the engine for supplying primary and secondary streams of combustible mixture to the combustion chamber, an incandescence igniter in the path of the main stream, and manually-controllable means for temporarily diverting the supply for the main stream in starting.

43. In continuous-combustion power-generating apparatus the combination of a combustion-chamber having a burner, means for supplying combustion fluids under pressure thereto, a surrounding wall with an intervening space between said wall and chamber, and a bridging portion between said chamber and said wall, formed with the chamber and perforated with a through passage from the exterior of the wall to the interior of the chamber opposite the region of the root of the flame.

44. In continuous-combustion power-generating apparatus, the combination of a pressure combustion-chamber having an inlet for combustion-fluids, and a lateral opening through its wall beyond said inlet, a combustion-tube forming a joint with the walls of the combustion-chamber beyond said opening, a cooling-chamber embracing the outlet from the combustion-chamber, and a passage from said cooling-chamber jacketing the combustion-tube and separated from the combustion chamber by said joint.

45. In continuous-combustion power-generating apparatus the combination of a pressure combustion-chamber having an inlet for combustion fluids, a cooling chamber having means for vaporizing water by contact of the hot gases from said combustion-chamber, and a passage for the steam and burnt-gas mixture leading from said cooling-chamber and jacketing the combustion chamber to a point back of the said inlet.

46. In continuous-combustion power-generating apparatus, the combination of a pressure combustion-chamber having a burner, a visual passage for viewing the interior thereof, a combustion-tube supported from a point on the opposite side of said passage from the burner and an outward passage for the products of combustion jacketing the burner at a point back of the visual passage.

47. In continuous-combustion power-generating apparatus, the combination of a combustion-chamber, a cooling-chamber adapted to contain a body of water for cooling the products of combustion from said chamber, a conduit for supplying combustion-fluid to said combustion-chamber, a passage for the cooled products of combustion, leading from said cooling-chamber and jacketing said combustion-chamber, whereby the cooled products are re-heated, and a passage leading from the first said passage and jacketing said conduit, whereby said re-heated products pre-heat the combustion-fluid.

48. In power-apparatus the combination of a closed internal-combustion generator having a burner, means for supplying air and fuel under pressure to said burner, a passage in the wall of said generator for viewing the interior thereof, provided with a visual pane, and an automatic check-valve opening toward the interior of the generator and normally lying aside from the line of vision through said passage for closing the passage in the event of breakage of the pane.

49. In continuous-combustion power-generating apparatus, the combination of a combustion-chamber having a primary burner and an igniting burner, means for supplying combustible to said burners, and means for automatically maintaining the supply for the igniting burner at a pressure higher than the pressure for the main burner by a substantially constant amount.

50. In power-generating apparatus, the combination of an internal-combustion burner-apparatus, a reciprocating engine of the steam-engine type supplied thereby and adapted to operate as a compressor on negative load, and a reservoir and connections for storing the fluid compressed by said engine and using it again in said engine.

51. In continuous-combustion power-generating apparatus, the combination of a constant-pressure combustion chamber, an engine supplied thereby and adapted to operate as a compressor on negative load, means to supply combustion fluids continuously under pressure to said chamber, a reservoir and connections for storing the fluid compressed by said engine, and an igniter operative in the combustion-chamber on the cessation of the main combustion for restoring the latter on resumption of positive load.

52. In power-generating apparatus, the combination of a combustion-chamber, means for supplying air and fuel thereto under pressure, an air-reservoir connected with the air-supply, an engine arranged to be driven by the products of combustion from said combustion-chamber and adapted to act as an air-compressor when subjected to negative load, and means for automatically shutting off the fuel connection to the combustion-chamber and for maintaining an air connection from the engine to the air-reservoir to store the air compressed in the engine when the latter acts as an air-compressor.

53. In power-generating apparatus, the combination of a combustion-chamber, compressors adapted to supply combustion-fluids to said chamber, and means controlled differentially by the pressure of said fluids for varying the output of one of said compressors.

54. In power-generating apparatus, the combination of a combustion-chamber, two compressors adapted to supply combustion-fluids to said chamber, and means controlled differentially by the pressures of said fluids for varying the cylinder clearance of one of said compressors.

55. In power-generating apparatus, the combination of a combustion-chamber, a compressor adapted to supply combustion-fluid thereto under pressure, means to automatically release a portion of said fluid when not required in the combustion-chamber, and means controlled by the pressure of said released fluid for varying the output of said compressor.

56. In power-generating apparatus, the combination of a combustion-chamber, a compressor adapted to supply combustion-fluid thereto under pressure, means to automatically release a portion of said fluid when not required in the combustion-chamber, and means controlled by the pressure of said released fluid for varying the cylinder-clearance of said compressor.

57. In power-generating apparatus, the combination of a combustion-chamber, a compressor adapted to supply combustion-fluid thereto under pressure, means controlled by the pressure of said fluid for releasing a portion thereof, and means controlled by the released pressure for varying the output of the compressor.

58. In power-generating apparatus, the combination of a combustion-chamber, a compressor adapted to supply combustion-fluid thereto under pressure, means controlled by the pressure of said fluid for releasing a portion thereof, and means controlled by the released pressure for varying the cylinder-clearance of the compressor and thereby varying its output.

59. In power-generating apparatus, the combination of a combustion-chamber, two compressors adapted to supply combustion-fluids to said chamber, means controlled differentially by the pressures of said fluids for releasing excess pressure of one of the fluids, and means controlled by the released fluid-pressure for diminishing the output of the compressor supplying the released fluid.

60. In power-generating apparatus, the combination of a combustion-chamber, two compressors adapted to supply combustion-fluids to said chamber, means controlled differentially by the pressures of said fluids for releasing excess pressure of one of the fluids, and means controlled by the released fluid-pressure for increasing the cylinder-clearance of the compressor furnishing the released fluid and thereby diminishing its output.

61. In continuous-combustion power-generating apparatus, the combination of a combustion-chamber, two compressors adapted to supply combustion-fluids to said chamber, an outlet from said chamber for the products of combustion, and means controlled differentially by the pressures of the two fluids for by-passing one of the fluids around the combustion-chamber into said outlet.

62. In continuous-combustion power-generating apparatus, the combination of a combustion-chamber, an engine supplied thereby two fluid-compressors adapted to supply combustion-fluids to said chamber, fluid-passages connecting the compressors with said combustion-chamber, and pressure-controlled means for automatically proportioning the total cross-sectional passage-areas for the respective engine-bound fluids to the relative outputs of the compressors during changes in the ratio of said outputs.

63. In continuous-combustion power-generating apparatus, the combination of a combustion-chamber, means to supply combustion-fluids thereto under pressure, an outlet from said chamber for the products of combustion, a by-pass connected with said outlet and adapted to divert one of said fluids around the combustion-chamber, a valve controlling said by-pass, and a device controlled differentially by the pressures of the fluids for operating said valve.

In testimony whereof I have affixed my signature, in presence of two witnesses.

EDWARD P. NOYES.

Witnesses:
SIDNEY A. REEVE,
R. M. PIERSON.